United States Patent

[11] 3,620,685

[72] Inventors Ronald S. Rogers;
 Oliver P. Proctor, both of Bartlesville, Okla.
[21] Appl. No. 846,005
[22] Filed July 30, 1969
[45] Patented Nov. 16, 1971
[73] Assignee Phillips Petroleum Company

[54] RADIAL FLOW CATALYST REACTOR
 4 Claims, 1 Drawing Fig.

[52] U.S. Cl. .................................................... 23/288 R,
 23/284, 260/696
[51] Int. Cl. ..................................................... B01j 9/04,
 C07b 3/00
[50] Field of Search ........................................ 23/284, 288
 R; 260/696

[56] References Cited
 UNITED STATES PATENTS
1,682,787 9/1928 Jaeger ........................... 23/288 R

| | | | |
|---|---|---|---|
| 2,363,738 | 11/1944 | Mather et al. ............... | 23/288 R |
| 2,525,276 | 10/1950 | Shapleigh ..................... | 23/284 UX |
| 2,969,318 | 1/1961 | Woodall ....................... | 23/288 R X |
| 3,288,874 | 11/1966 | Bowles ......................... | 23/204 R X |
| 2,173,844 | 9/1939 | Houdry ......................... | 23/288 R UX |
| 2,517,525 | 8/1950 | Cummings ..................... | 23/288 K |

Primary Examiner—Joseph Scovronek
Assistant Examiner—Barry S. Richman
Attorney—Young and Quigg

ABSTRACT: A radial flow catalyst reactor designed to provide maximum area of exposure of catalyst to a fluid feed while yet providing for rapid removal of effluent of the reaction from the reactor. For larger reactors, an internal space-occupying thumb reduces fluid-flow space and increases the rapidity of escape of the effluent. The reactor and catalyst cases are designed to allow for overfill to permit settling of catalyst particles in the cases without bypassing of the catalyst.

PATENTED NOV 16 1971  3,620,685
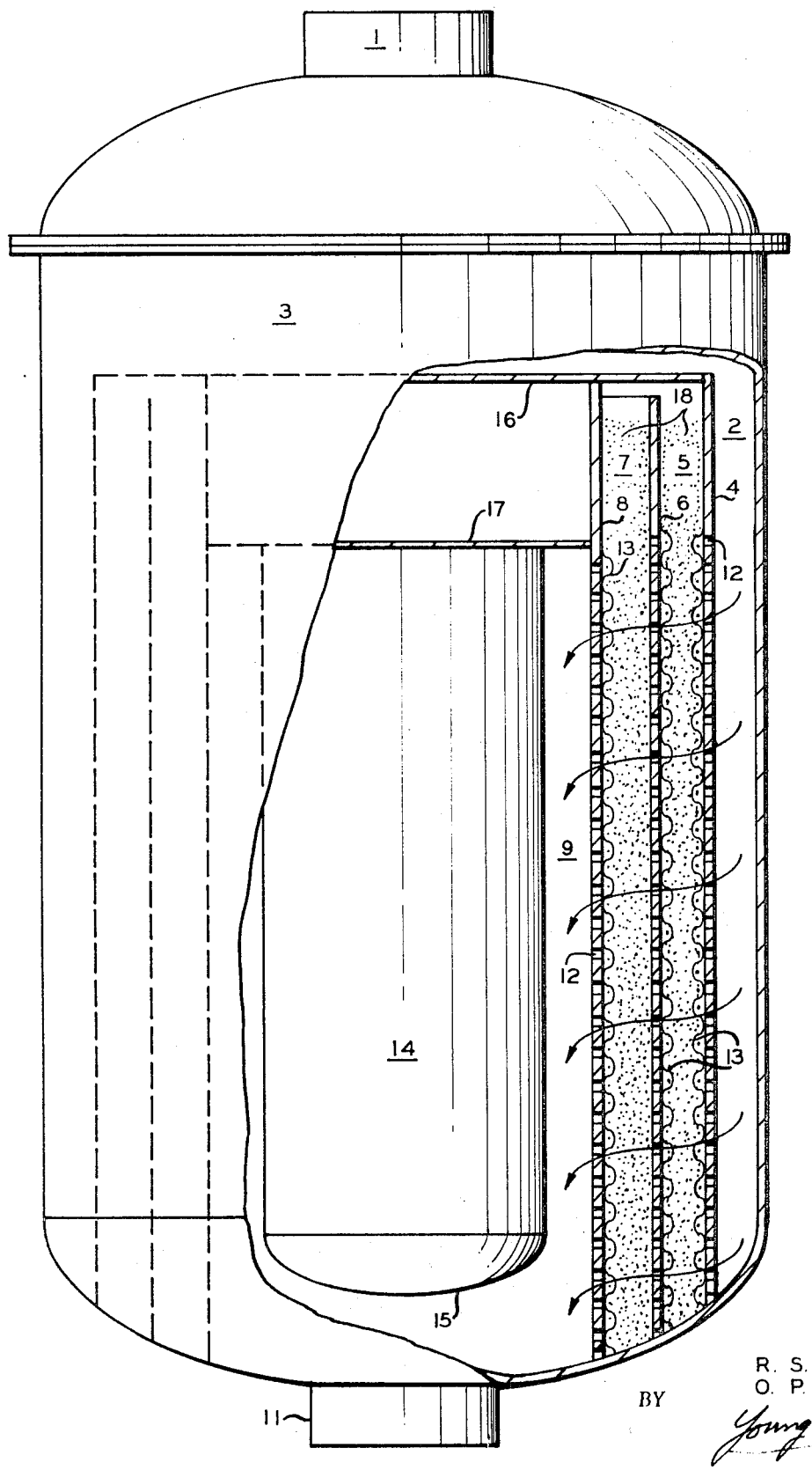
INVENTORS
R. S. ROGERS
O. P. PROCTOR
BY Young & Quigg
ATTORNEYS

RADIAL FLOW CATALYST REACTOR

This invention relates to reactors designed for catalytic processes with solid particle catalysts, such as the radial flow catalyst reactors. In another aspect, this invention relates to a method of designing catalyst cases in radial flow catalyst reactors so as to avoid short circuiting of feed streams due to catalyst settling.

Radial flow catalyst reactors are used in dehydrogenation, particularly the oxidative dehydrogenation or oxydehydro processes.

In these processes it is necessary to remove or exit the catalytically treated fluid effluent from the reactor as quickly as possible after contact with the catalyst in order to quench the effluent so as to avoid undue continuing side reactions and the like and thus to preserve a maximum amount or quantity of desired product or products. Yet, at the same time, it is desired to have a large maximum diameter shell of catalyst, or shells of catalysts, so that maximum quantities of influent feed stock can be treated per unit time in a single reactor. Since the contact time for the reactants with the catalysts must be very short, it is necessary to limit the catalysts to relatively thin layers. In larger more economical reactors with larger areas of thin layers of catalyst capable of treating larger quantities of fluid, the fluid, once having contacted the catalyst layer or layers, reaches a large vacant space within the reactor. This space results in an undesirable time lag before the reactants can be exited and the result is the loss or wastage of material by deterioration of the quality or desired content of this effluent.

The catalyst granules or particles within the layers tend to settle and pack down with time, probably due to the vibration or jiggle associated with the operation of such equipment. The particles gradually settle down to a surprising degree. Undesirably, this leaves vacant upper areas where the influent fluid can slip by or bypass the catalyst layers and travel on through without being catalytically treated.

We have solved both problems with our invention, a special radial flow reactor, which has greatly restricted center space and so exits the treated fluid rapidly, and which has special catalyst layers with overfill capacity.

In one embodiment, we place within our radial flow catalyst reactor a large essentially vertical closed shell, something like a large inverted thumb thrust down in the middle of the reactor. The effect of this thumb, invertedly suspended within the last catalyst-retaining cylinder, is to form form a very thin last space-restricted fluid-flow space. The thin space is formed between the last or inner concentric perforated cylinder holding a layer of catalyst and the outer surface of this central thumb. This large central thumb acts to reduce the fluid residence time and causes the fluid to exit rapidly.

The inverted thumb has decided advantages over other possible methods of occupying the central fluid-flow space. Filling much of the inner space with various extraneous materials, such as bricks or tiles, may interfere with proper exit fluid-flow patterns due to lack of uniformity in space-occupying ability, add undue weight both of their own and by absorption, may physically damage the last or inner catalyst-retaining shell upon filling or by vibration, may even act as demicatalysts affecting the qualities of the exit fluid.

Therefore, it is an object of our invention to provide an improved reactor for catalytic processes employing thin layers of solid particle catalysts contained within cylinders. It is a further object to provide a reactor designed to exit fluid from the reactor as rapidly as possible after contact with the catalyst. An additional object is to provide an improved oxidative dehydrogenation process. A further object is to provide a reactor whose annular catalyst-containing spaces permit overfilling with catalyst, allowing settling of the catalyst, avoiding bypassing of fluid, and maintaining full contact area to the feed stream.

Other aspects, objects, and the several advantages of our invention will be apparent to one skilled in the art from the following description and appended claims.

Our reactor consists basically of a large outer essentially vertical shell with a fluid inlet at the top and a fluid outlet at the bottom. Contained within the reactor are one or more, usually two, concentric layers or rings of catalyst. These catalyst layers are held in place by concentric perforated cylinders set within the reactor and spaced from the outer wall of the reactor by suitable distances. Where two or more layers of catalyst are utilized, usually they are spaced from each other only by a concentric retainer or cylinder. However, a vacant or empty layer could separate them if desired. The last concentric cylinder forms a space within the center of the reactor which space acts as a fluid-flow space.

In one embodiment of our invention, an inverted closed cylinder which we term a "thumb" occupies a large quantity of the space in the center of the reactor. This thumb forms, then, a restricted-volume fluid-flow space between the inward side of the last or inner concentric perforated catalyst-retaining cylinder and the outer surface of our inverted thumb. This central thumb acts to drastically reduce the fluid residence time in the center of the reactor while yet permitting the concentric catalyst shells to remain relatively large in diameter so as to handle maximum quantities of influent fluid per unit time.

Once the fluids, liquids or gasses, have contacted the catalyst or catalysts, prompt further treatment is necessary for proper recovery of desired product. For example, in the oxidative dehydrogenation of olefins to diolefins, such as butene to butadiene, prompt quenching of the effluent fluid is essential to high productivity.

The drawing illustrates an embodiment of our invention. It shows a radial flow catalyst reactor, fluid inlet at the top and exit at the bottom, two concentric layers of catalyst, and within the center of the reactor an inverted fluid-flow space-occupying thumb. The thumb is sealed since fluid entry thereto is undesired. The catalyst-retaining cylinder design permits the concentric layers of catalyst to be overfilled so as to allow for settling without fluid bypass or short circuiting. Perforations for fluid passage commerce well below the initial catalyst fill levels. The upper cap or cover of the inverted thumb covers not only the space-occupying thumb itself but also the layer or layers of catalyst acting as a total seal overall so that the entering feed stream can pass through the concentric layers of catalyst only in areas where catalyst is present.

Using as an illustrative and nonlimitative embodiment of our invention the conversion of butene to butadiene, a mixture of reactants composed of (I) butenes to be converted as well as other hydrocarbons where present with the butenes, (II) air necessary to supply the oxygen for the oxydehydrogenation process, and (III) optionally, steam, all enter the reactor through inlet 1. The mixture, usually preheated, flows through the annular space 2 which surrounds the outer catalyst-retaining cylinder 4 and within the outer wall 3 of the reactor shell itself.

The hot mixture flows through the perforations 12 of the first of three concentric perforated cylinders 4, contacting the outer layer of catalyst 5, then through the perforations 12 of the next concentric perforated cylinder 6, contacting the inner layer of catalyst 7, through the perforations 12 of inner cylinder 8 into annular fluid-flow space 9, and the now catalytically reacted mixture rapidly exits through fluid outlet 11.

The concentric catalyst-retaining cylinders 4, 6, and 8 usually are made of steel, as is the reactor in general, though other materials of construction, such as high-temperature-tolerant ceramics may be useful, particularly for the catalyst-retaining cylinders. Shell, thumb, and other members may be of any metal useful in such reactors, iron, steel, titanium, and the like. The perforations or holes 12 in the catalyst retaining cylinders 4, 6, 8, are conduits for passage of the fluid stream, and may be of sizes as desired, depending primarily on particle size of the catalyst. If the holes are too large for retention of the catalyst particles, the holes can be covered with screen or other protective devices 13 to retain the catalyst particles. The perforations 12 in the cylinders commence well below the initial catalyst fill levels in order to provide settling height for the catalyst particles.

Of course, there can be more or less than three concentric perforated cylinders producing two layers of catalyst. There can be two concentric layers producing one layer of catalyst; four concentric cylinders producing three layers of catalyst; or a plurality of retaining cylinders with one or more spaces therebetween vacant, as may be desired for particular processes such as spacing catalyst layers apart from each other. Alternatively, one layer can be catalyst, and other layer or layers, if any, can be dead space filled with inert material. Some reactions may require different types or kinds of catalyst within individual catalyst cylinders, to take advantage of different results at different temperatures or times, or produce different results on differing feedstreams.

The final annular space 9 for fluid-flow is formed by the space between the last concentric cylinder 8 in our two-catalyst-layer illustration, and the inverted space-occupying thumb 14. The inverted thumb 14 is capped or closed on the bottom 15, and at the top 16. The embodiment illustrated shows two closures at the top of the thumb, 16 and 17, though this is an optional feature of construction. The thumb 14, as shown in the drawing, fills a very considerable and substantial portion of the overall center cavity within the final concentric catalyst-retaining cylinder 8, thereby causing the fluid passing through the reactor to have a desirably exceedingly short residence time in the final annular space 9.

The outer cap 16 prevents fluid from flowing into the top of the inverted thumb 14. The outer cap 16 aids in preventing the fluid from bypassing a portion of the catalyst in the catalyst spaces 5 and 7. When the annular spaces 5 and 7 are filled with catalyst, or catalysts, or other material, they are filled to or very nearly to the top of the retaining cylinders 4, 6, and 8. This overfill ability or capacity of our reactor is shown at 18. This feature allows the catalyst or catalysts to settle within the cylinders 4, 6, 8 in the catalyst areas 5 and 7 and yet avoid any open spaces for short circuiting of influent fluid and loss of efficiency of the reactor.

Our reactor is suitable for a number of processes, particularly the oxidative dehydrogenation processes. Suitable oxidative dehydrogenation processes are those which dehydrogenate reactants such as alkenes, cycloalkenes, alkylpyridines, and alkylaromatics, using an elevated temperature, and a molecular oxygen-containing gas, with or without the presence of steam.

The basic processes ordinarily are carried out by forming a mixture, preferably preheated, of the organic compound feed, steam if used, and oxygen or oxygen-containing gasses, and passing such mixture over the catalyst by means of reactor under the desired temperature pressure conditions. Recycle of unconverted compound and/or steam condensate can be employed if desired.

These reactions are exothermic within the catalyst beds, and our reactor lends itself to the importantly fast exit of reaction products after contact with the catalyst. This design, coupled with the catalyst layer overfill capability, results in a uniquely effective reactor.

Reasonable variations and modifications of our invention are possible and yet still be within the scope of our disclosure and such would be no departure from the scope and spirit thereof.

We claim:

1. A radial flow apparatus for catalytic reactions comprising
   a vertically disposed outer shell,
   fluid inlet means in an upper portion of said shell,
   at least one outer catalyst-retaining cylinder disposed vertically within said shell, said outer cylinder defining in conjunction with said shell an outer fluid flow annulus connecting with said fluid inlet means, said outer cylinder having means disposed at the top thereof to prevent fluid flow through the top of said outer cylinder,
   at least one inner catalyst-retaining cylinder disposed vertically within said outer cylinder so as to define at least one inner annulus between said cylinders, said inner catalyst-retaining cylinder further defining a central fluid-flow exit space,
   a mass of solid particulate catalyst particles within said inner annulus, the initial filling volume of said mass occupying essentially the maximum volume of said inner annulus, said mass in said inner annulus defining a catalytic reaction zone,
   a centrally positioned inverted sealed thumb disposed within said central fluid-flow exit space, said inverted sealed thumb occupying a substantial portion of said central fluid-flow space and substantially restricting the volume of said central fluid-flow space to a fluid-flow annulus defined between the outer surface of said inverted sealed thumb and the inner surface of said inner catalyst-retaining cylinder, wherein the upper of said spaced-apart tops further sealably connects with said means disposed at the top of said outer catalyst-retaining cylinder, and the lower of said spaced-apart tops sealably connects with said inner catalyst-retaining cylinder thereby defining the upper limits of said fluid-flow annulus, and said essentially parallel spaced-apart tops further defining in conjunction with said at least one outer catalyst-retaining cylinder and said at least one inner catalyst-retaining cylinder a substantial overfill capacity in said at least one inner annulus between said cylinders,
   perforations at spaced intervals in each of said catalyst-retaining cylinders, said perforations permitting fluid-flow therethrough while essentially preventing passage of said particulate catalyst particles, said perforations commencing in the bottom area of said cylinders, continuing at spaced intervals upwardly and essentially uniformly throughout said cylinders, and ceasing effectively substantially at a level defined by said lower of said spaced-apart tops, thus further defining said overfill capacity for said particulate catalyst particles in said inner annulus, and
   fluid outlet means in a lower portion of said shell and connecting with said fluid-flow space.

2. The apparatus according to claim 1 wherein said means to seal the top of said outer cylinder comprises said upper top of said sealed thumb which extends over and seals both the top of the outer cylinder and said inner annulus space.

3. The apparatus according to claim 2 wherein is disposed a plurality of catalyst-retaining cylinders defining a plurality of inner annuli one less in number than the number of said catalyst-retaining cylinders.

4. The apparatus according to claim 3 wherein the materials of construction for said shell are ferrous alloys or titanium alloys; and wherein said catalyst-retaining cylinders are constructed from ferrous alloys or high-temperature-tolerant ceramics.

* * * * *

UNITED STATES PATENT OFFICE
CERTIFICATE OF CORRECTION

Patent No. 3,620,685   Dated November 16, 1971

Inventor(s) Ronald S. Rogers et al.

It is certified that error appears in the above-identified patent and that said Letters Patent are hereby corrected as shown below:

Claim 1, column 4, line 21, after "thumb" and before "occupying" insert -- including two essentially parallel spaced tops, said inverted sealed thumb --.

Signed and sealed this 13th day of June 1972.

(SEAL)
Attest:

EDWARD M. FLETCHER, JR.
Attesting Officer

ROBERT GOTTSCHALK
Commissioner of Patents